June 4, 1929.  O. L. BICKFORD ET AL  1,716,204
SIGNALING SYSTEM
Filed Feb. 5, 1927    2 Sheets-Sheet 1
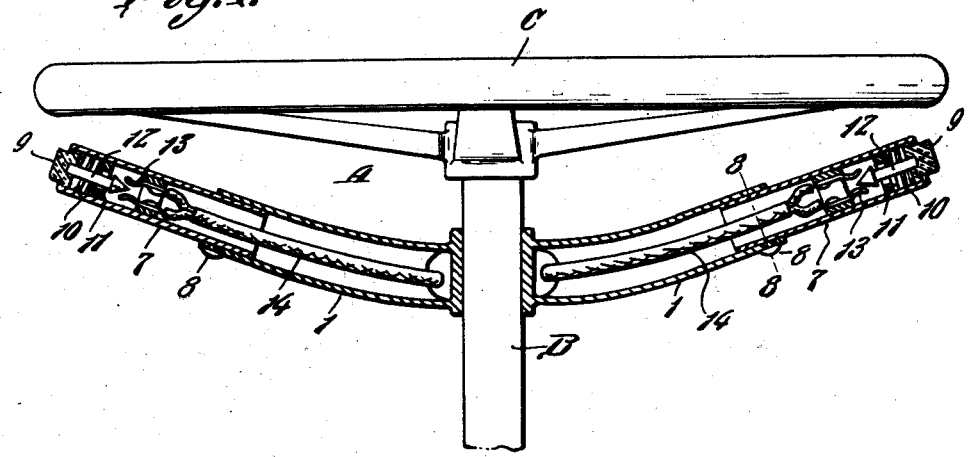
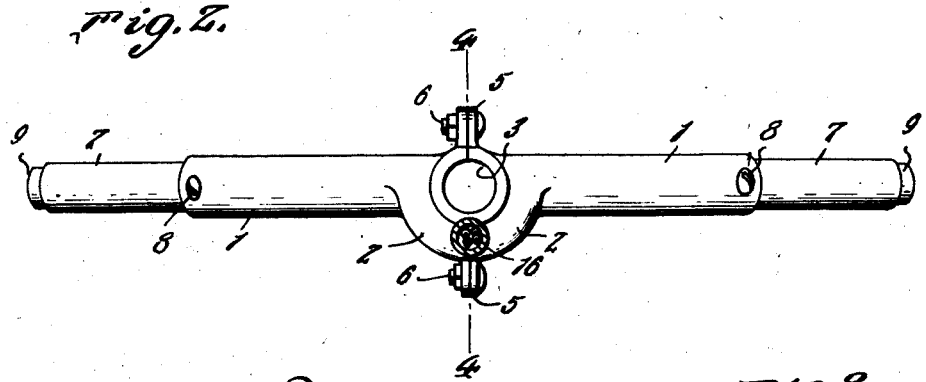
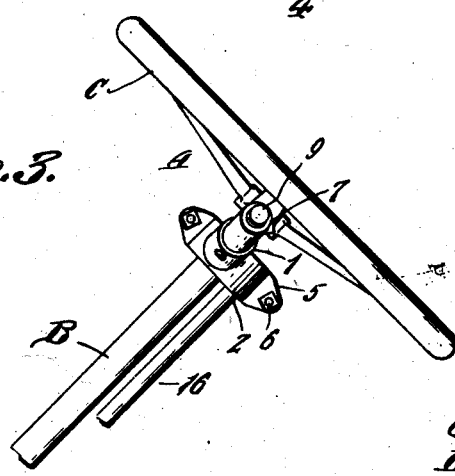
O. L. Bickford,
H. S. Denley,
INVENTORS
BY Victor J. Evans
ATTORNEY June 4, 1929.  O. L. BICKFORD ET AL  1,716,204
SIGNALING SYSTEM
Filed Feb. 5, 1927   2 Sheets-Sheet 2

O. L. Bickford,
H. S. Denley,
INVENTORS

BY Victor J. Evans
ATTORNEY

Patented June 4, 1929.

1,716,204

UNITED STATES PATENT OFFICE.

OSCAR L. BICKFORD AND HORACE S. DENLEY, OF TOLEDO, OHIO.

SIGNALING SYSTEM.

Application filed February 5, 1927. Serial No. 166,185.

This invention relates to a signal system for motor vehicles and the like, the general object of the invention being to provide a simple form of signal which contains lamps for illuminating the stop and turning signal means with a simple arrangement of the stering column below the steering wheel for enabling the driver to close the circuit of the turning signal means without removing his hands from the wheel.

Another object of the invention is to make the parts adjustable so that they can be used with different sizes of steering wheels.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a view of portion of a steering column and its wheel showing the switch carrying member in section thereon.

Figure 2 is a bottom plan view of the switch carrying member.

Figure 3 is a side view of Figure 1.

Figure 4 is a section on line 4—4 of Figure 2.

Figure 8 is a section on line 8—8 of Figure 1.

Figure 5:
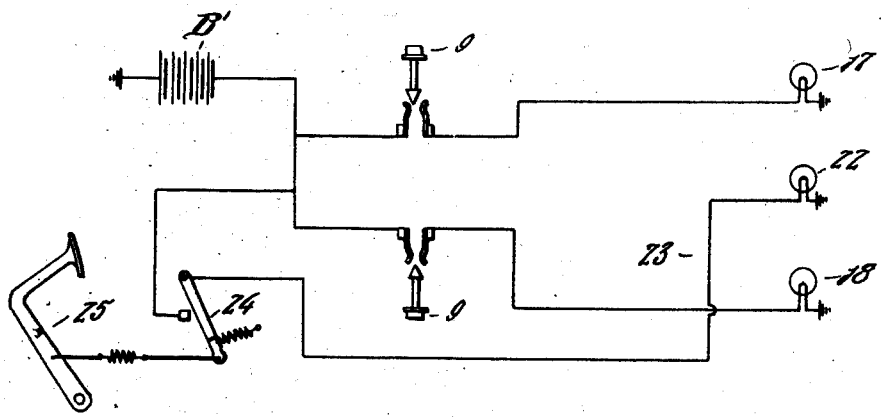
Figure 5 is a diagrammatic view of the circuits.
Figure 6:
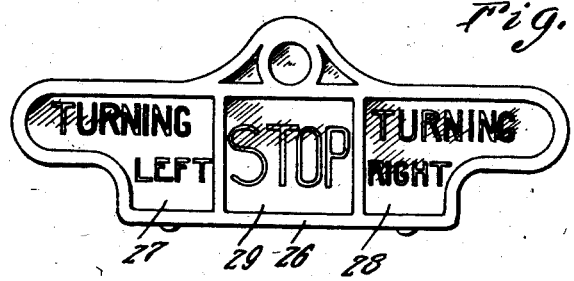
Figure 6 is a front view of the signal device.
Figure 7:
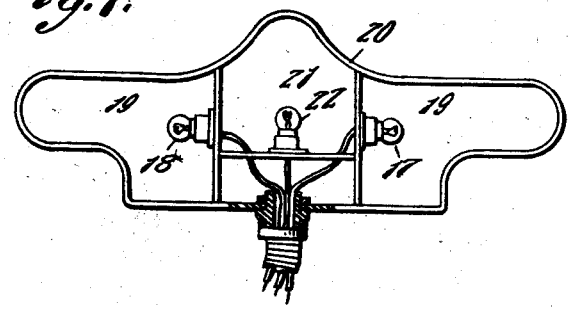
Figure 7 is a view of the signal device with the front removed and with parts in section.

As shown in these drawings, we place a member A on the steering column B immediately below the wheel C thereof, said member comprising a pair of tubular arms 1, the inner end of each of which is formed with an enlargement 2 which has a semi-circular recess 3 therein so that when the two enlarged ends are placed together, a circular opening is formed to receive the steering column B. Each enlargement is provided with oppositely arranged ears 5 and the ears on the two enlargements are fastened together by the bolts 6 so that the device is clamped to the steering column. As will be seen, it can be adjusted toward and away from the wheel. A tubular extension 7 is telescopically arranged in the outer end of each arm and said extension is held in adjusted position by a screw 8 passing through the arm 1 and engaging the extension. A push button 9 is slidably arranged in the outer end of each extension and is normally held projected by a spring 10 arranged in the extension between the button and a perforated partition 11 in said extension. A headed rod 12 is carried by the button and passes through the perforation in the partition with its head arranged to engage the pair of spring contacts 13 when the button is pushed inwardly so as to bridge the contacts and thus close an electric circuit through the conductors 14 which pass through the arm and through a passage 15 formed in each enlargement 2 and then the conductors are passed through a pipe 16 which has its upper end clamped between the enlargements 2. This pipe extends parallel with the steering column.

One of the conductors is connected with the battery B of the car or other source of supply and the other conductor is connected with a lamp 17. One of the conductors which is connected with the second switch 13 is connected with a lamp 18, these lamps being placed in the end compartments 19 of a casing 20 which is adapted to be fastened to the rear part of a motor vehicle. The casing is also provided with a central compartment 21 which contains a lamp 22, the circuit 23 of which is adapted to be closed by a switch 24 when the brake pedal 25 of the vehicle is depressed. The front 26 of the casing 20 contains the transparent members 27 and 28 at its ends and the transparent member 29 at its center. The end transparent members cover the end chambers 19 and the member 27 contains the words "Turning Left" while the member 28 carries the words "Turning Right". The central transparent member carries the word "Stop".

From the foregoing it will be seen that when the brake pedal is depressed to stop the vehicle, the circuit of the lamp 22 will be closed so that the stop signal will be illuminated, thus indicating that the vehicle is to be stopped. When the vehicle is to be turned to the left, the operator will touch the button 9 on the left hand side of the member A so as to close the circuit to the lamp 18 to illuminate the left hand turning signal and when the vehicle is to be turned to the right, the other button 9 is pushed inwardly to close the circuit of the lamp for indicating that the vehicle is to make a right turn. As shown in Figure 5, the lamps are all grounded to a part of the vehicle.

The arrangement of the push buttons will permit the driver to depress either one by simply removing one finger of his hand from the steering wheel and placing it against the button so that it is not necessary to remove his hands from the steering wheel in operating the signals. By making the extensions adjustable in the arms 1, the device can be adjusted to suit steering wheels of different sizes and the entire device can be adjusted toward and away from the steering wheel to place the buttons the desired distance from the wheel.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

Circuit closing means for a motor vehicle comprising a supporting member formed in two parts, each part consisting of a tubular arm with a hollow enlargement at its inner end containing a semi-circular recess, means for fastening the enlargements together with the recesses receiving a steering column of a motor vehicle, each enlargement being in communication with its arm, whereby a conductor can pass through the enlargement into the arm, a tube in communication with each enlargement whereby the conductors can pass from the enlargements through the tube, each enlargement having a small recess therein forming an opening for the tube when the enlargements are placed together and a push-button switch at the outer end of each arm.

In testimony whereof we affix our signatures.

OSCAR L. BICKFORD.
HORACE S. DENLEY.